UNITED STATES PATENT OFFICE.

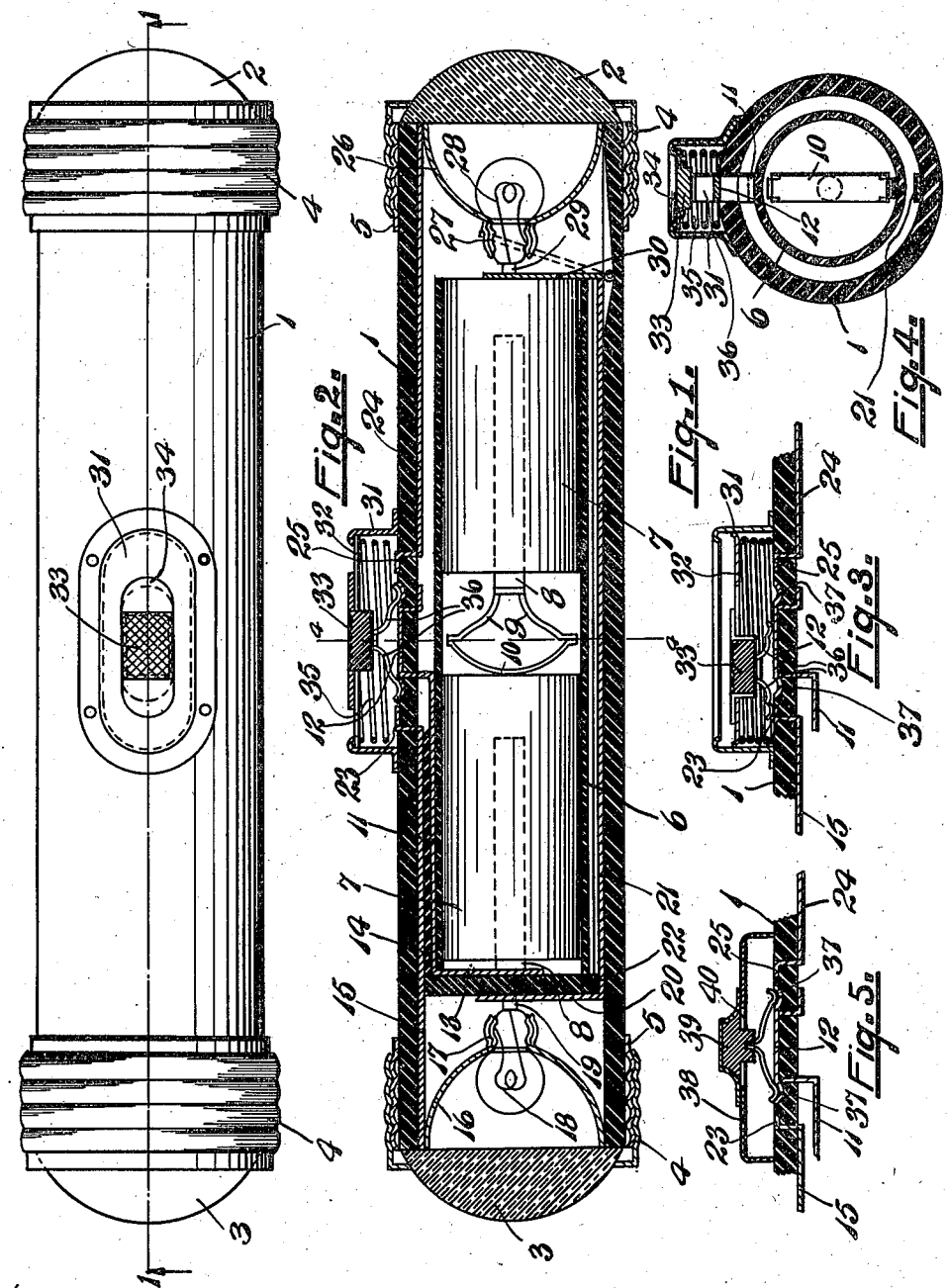

JAMES E. BROADHEAD, OF BAY CITY, MICHIGAN.

TRAINMAN'S FLASH-LIGHT.

1,203,576. Specification of Letters Patent. Patented Nov. 7, 1916.

Application filed January 18, 1915. Serial No. 2,939.

*To all whom it may concern:*

Be it known that I, JAMES E. BROADHEAD, a citizen of the United States of America, residing at Bay City, in the county of Bay and State of Michigan, have invented certain new and useful Improvements in Trainmen's Flash-Lights; and I do hereby declare the following to be a full, clear, and exact description of the invention, such as will enable others skilled in the art to which it appertains to make and use the same.

This invention relates to an electric flash-light adapted for use particularly by trainmen.

It is the object and purpose of this invention to provide a flash-light of this character which will contain two lights operable by means of a single switch and adapted to contain electric batteries as the source of energy for furnishing the light which may be utilized to light either of two small electric lamps forming a part of the flashlight.

It is a further object and purpose of the invention to provide the light with various new and useful features of construction and in particular with a novel means for holding the batteries and for permitting their renewal.

For an understanding of the construction by which these ends are attained together with others not specifically enumerated, reference may be had to the accompanying drawing, in which;

Figure 1 is a vertical section taken longitudinally of the flash-light on the line 1—1 of Fig. 2. Fig. 2 is a plan view of the flashlight. Fig. 3 is a vertical section taken through the switch mechanism and showing it in the position it will take to complete the circuit through one of the lamps. Fig. 4 is a section taken transversely through the flash-light on the line 4—4 of Fig. 1; and Fig. 5 is a vertical section illustrating a modification in switch construction.

Like reference characters refer to like parts throughout the several views of the drawing.

In the construction of the flash-light there is provided a cylindrical casing 1 of any suitable insulating material, such as fiber or the like which, at its ends, is provided with lenses 2 and 3, detachably connected to the casing 1 by means of screw threaded caps 4 engaging with screw threaded sleeves 5 secured at the ends of the casing. These lenses may be removed at any time and it is designed that one of them shall be of red glass while the other is of the usual colorless glass permitting it to pass all of the rays of light coming from the lamp that is located behind it.

Secured within the casing 1 is a smaller cylindrical casing 6 formed of any suitable insulating material, preferably of cardboard, which is adapted to carry two electric batteries comprised of zinc elements 7 and carbon elements 8 of the usual construction, the batteries being connected in series by means of the separate members 9 and 10, as shown in Fig. 2, which are interposed between the zinc element of one battery and the carbon element of the other. These members 9 and 10 are resilient so as to permit an adjustment of the batteries as to distance between them. Outside of the casing 6 and above one of the batteries, which for convenience, will be termed the forward battery, is located a metallic strip 11, at its rear end being bent and passed through the outer casing 1 and forming a contact 12 while at its front end it is bent downwardly at 13 and connected with the carbon element 8 of the forward battery.

Above the strip 11 is located an insulating section 14 and between this section and the wall of the casing 1 a metal strip 15 is secured which extends forward to the front lens 3 having contact with the reflector 16 which also is of metal and which is provided with a socket 17 having contact engagement with one end of the filament 18 of the forward light which is located back of the forward lens 3 and in the reflector 16, the other end of said filament being connected with a member 19 having contact with the upwardly extended end 20 of a metal strip 21 which lies against the side of the casing 1 opposite the strip 15 and which extends the full length of the inner casing 6. A block 22 of any suitable insulating material separates the ends 13 and 10 of the strips 11 and 21. The rear end of strip 15 is bent and passed through the upper side of the casing 1 and turned to form a contact 23 lying in the same plane and closely adjacent but insulated from the contact 12 heretofore described.

It will be noted that strip 15 extends from the forward end of the casing 1 to a point adjacent the middle of said casing. In the similar manner a strip 24 of metal is provided and secured to the inner side of the casing 1 having a contact 25 formed practically identical to the contact 23 but lying at the opposite side of contact 12, the rear end of strip 24 bearing against the reflector 26 for the rear lamp which has a socket 27 connected with one end of the filament 28 of the rear lamp, the other end of said filament being attached to a member 29 which contacts in any suitable manner with the vertically extending strip 30 hinged at its lower end to the strip 21 so that it may be moved into a substantial horizontal position for a purpose hereafter to be described.

The switch mechanism is located on the upper side of the casing 1, a housing 31 being attached to the casing and within which is located a plate 32 slotted to receive the movable switch member 33 corrugated on its upper side for convenience in use and extending through a slot 34 in the housing 31. Plate 32 is normally held in upper position by means of the coil springs 35 while the movable switch member 33 has projecting from the underside thereof a pair of contacts 36 which in normal position are adapted to seat in the depressions 37 formed of metal and connected with the contact 12. Contact members 36 are of spring material and readily yield when pressure is exerted upon the switch member 33.

In operation, when the parts are in the position shown in Fig. 2, no current passes through either of the lamps but if it is desired to light the forward lamp the finger is placed on the switch member 33 and it is moved forward as shown in Fig. 3 until the contacts 36 bear against contacts 23 and 12, thus completing the current. The current will pass from the forward carbon 8 to parts 13, 14 and 12, through the switch members 36 to contact 23, thence through the strip 15, reflector 16 and socket 17 to the filament 18, making it incandescent, afterward following through member 19 and parts 20, 21 and 30 to the zinc element 7 of the rear battery, thence through its carbon 8 and members 9 and 10 to the front battery. The forward light will be lighted and will remain lighted as long as switch member 33 is held in such position. Upon release of the switch member the plate 32 will carry it upwardly but it will not be returned to its central position until carried back manually. To light the rear light the same process is carried out except the switch member is moved in the opposite direction, the current in such case passing from the forward carbon 8 through parts 13, 11 and 12 and the contacts 36 to strip 24, reflector 26 and socket 27 to the filament of the rear lamp, the current returning through the members 29 and 30 to the zinc element 7 of the rear battery as will be readily understood.

A modified form of switch construction is illustrated in Fig. 5 consisting of a housing 38 through which extends a switch member 39 provided on its underside with spring contacts 36, the switch member extending through a slot 40 in the housing 38 permitting its slidable movement so that it may complete the circuit through the strips 11 and 15 or 11 and 24, as desired. This is an alternative form of the switch but the preferred type is shown in Figs. 1 and 3.

When the batteries become exhausted it is easy to renew them, the rear cap 4 being unscrewed, thereby releasing the lens 2 upon which the lamp and the rear reflector 26 may be readily removed. The hinge member 30 may then be turned so as to lie substantially in alinement with the strip 21 and the batteries removed from their casing 6, new ones being put in their place with the resilient members 9 and 10 positioned between their zinc and carbon poles. With the replacement of the rear lamp, reflector and lenses, the hinge member 30 is forced against the zinc element 7 of the rear battery and all of the parts are held together against accidental displacement.

It will be apparent that in this construction I have provided a flash-light operable by a single switch which may be lighted at either end and one which will be of especial use to trainmen in the matter of signaling, one lens being adapted to pass white light, and the other a red light. The switch mechanism is of very simple character and serves the dual purpose of lighting either light at will. The hinged connection of the member 30 renders the batteries easily accessible for their changing and renewal. The construction is substantially moisture proof which is a very necessary feature in devices of this character.

Changes in detail may be resorted to without departing from the spirit of the invention. The appended claims define the invention and all modifications in structure falling within their scope are to be considered as comprehended by the invention.

I claim:—

1. A flash-light comprising a cylindrical casing open at both ends, a lens and light detachably positioned at each end of the casing, a second casing located within the first casing and containing electric batteries, a switch located on the outside of the outer casing including a member movable longitudinally of the casing, connections between the lights, batteries and switch for lighting either light by operation of the switch in opposite directions, and means for retaining the batteries in position within the inner casing operated by the connection of one of the lamps to the casing, substantially as described.

2. In a flash-light, a cylindrical outer casing having open ends, an inner cylindrical casing lying lengthwise inside the outer casing, a strip having an upturned end secured to the inner side of the outer casing, a second upturned end hinged to the opposite end of the strip and means for detachably engaging a light against each of said upturned ends and for detachably securing a lens at each end of the outer casing, substantially as described.

3. Means for holding batteries and connecting them in series in an electric flashlight comprising a strip having an upturned integral end and a similar end hinged to the opposite end of the strip, a cylindrical casing lying between the said upturned ends, batteries positioned end to end within said casing and yielding contact connections between the opposed poles of the batteries.

4. In an electric flash-light, an outer cylindrical casing open at both ends, a lens positioned at each end of the casing, a cap detachably securing each lens in place, a reflector having an electric light located back of each lens and bearing thereagainst, a metal strip connected to an inner side of the casing having an integral upturned end against which one light contacts, an insulating block positioned adjacent said end, a member hinged to the other end of said strip and lying vertically against which the other light contacts, electrical connections between the lights and reflectors, an inner casing positioned between the insulating block and the hinged member, batteries connected in series within said casing, a pole of one of said batteries having contact with the hinged member, connections leading from the reflectors, a connection leading from the opposed pole of the other battery and switch mechanism for completing a current through a gap between said last named connection and either of the connections from the reflectors.

5. In a flash-light, a cylindrical casing having a lens secured at each end, an electric light and reflector back of each lens, an electric battery within the casing, electrical connections between the lights and their respective reflectors, connections between the lights and one pole of the electric battery, electrical conductors connecting with each of the reflectors and leading therefrom to a position adjacent the center of the casing, a connection leading from the opposite pole of the battery to a point adjacent the said conductors but separated therefrom and switch mechanism for bridging the gap between said last conductor and either of the last named conductors, substantially as described.

6. The combination with a tubular casing, of an electric light at each end of said casing, a battery having one of its poles having a contact at each end located within the casing, the contacts at the respective ends having connection each with a contact of one of said lights, and an open-circuit switch having connection with the battery and lights and arranged to complete the circuit between the battery and either of said lights selectively.

In testimony whereof I affix my signature in presence of two witnesses.

JAMES E. BROADHEAD.

Witnesses:
 FRANK C. FEARMAN,
 EDWARD R. MONROE.